United States Patent

[11] 3,552,545

| [72] | Inventor | Byron King Hartman |
| | | 910 Lakeview Drive, Chicago, Ill. 60611 |
| [21] | Appl. No. | 805,993 |
| [22] | Filed | Feb. 27, 1969 |
| [45] | Patented | Jan. 5, 1971 |

[54] VIBRATORY HOPPER AND TROUGH COUPLED AS A TWO-MASS TUNED VIBRATORY SYSTEM
8 Claims, 13 Drawing Figs.

[52] U.S. Cl. .................................................. 198/220
[51] Int. Cl. ..................................................... B65g 27/00
[50] Field of Search........................................ 198/220;
209/214, 215, 425, 286

[56] References Cited
UNITED STATES PATENTS

| 1,066,656 | 7/1913 | Richardson | 198/220(D22) |
| 2,947,183 | 8/1960 | Carrier | 198/220(D22) |
| 2,984,339 | 5/1961 | Musschoot | 198/220(D22) |
| 3,232,492 | 2/1966 | Carrier | 198/220(D20)UX |

*Primary Examiner*—Richard E. Aegerter
*Attorneys*—Francis W. Anderson and Charles E. Tripp ABSTRACT: A vibratory hopper and trough combination comprising a two-mass spring coupled system having one mode of vibration and tuned close to but less than the frequency of the applied vibratory force. One mass comprises an independently mounted bottom or discharge portion of the hopper and its contained material. The other mass is the trough for carrying the material away from the hopper discharge opening. The force generating means of the two-mass spring coupled system may be attached to either mass to produce a periodically varying force to keep the system in vibration. The frequency of the exciting force is variable to a maximum of approximately 90 percent of the natural frequency of the system, and thereby there is provided a method for controlling delivery rate of the material. This system provides vibration in the bottom portion of the feed hopper to insure free flow of material therefrom thereby eliminating auxiliary vibrators. Also eliminated by the present system are the auxiliary masses which were associated with tuned vibratory feeders of the prior art, such auxiliary masses being required in order to provide a reaction mass for the vibrated trough.

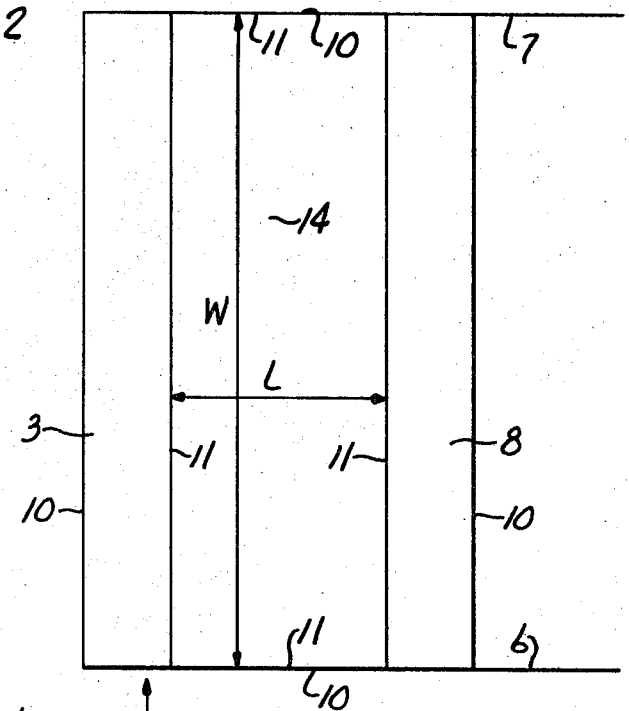
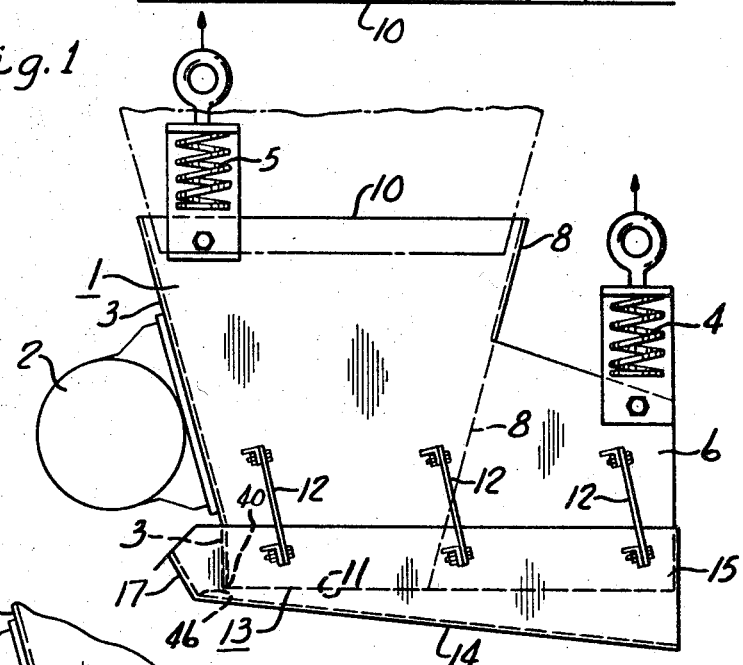
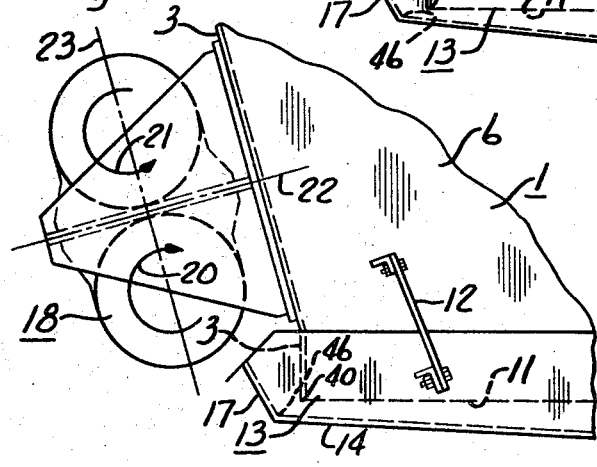
BYRON K. HARTMAN
BY
CAROTHERS & CAROTHERS
HIS ATTORNEYS

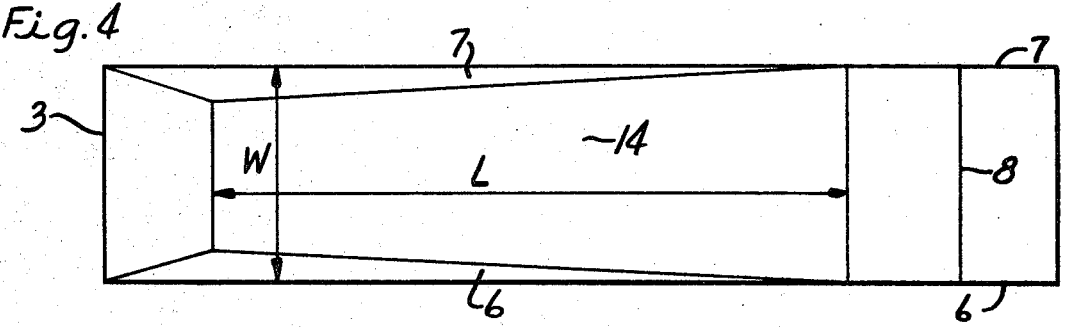
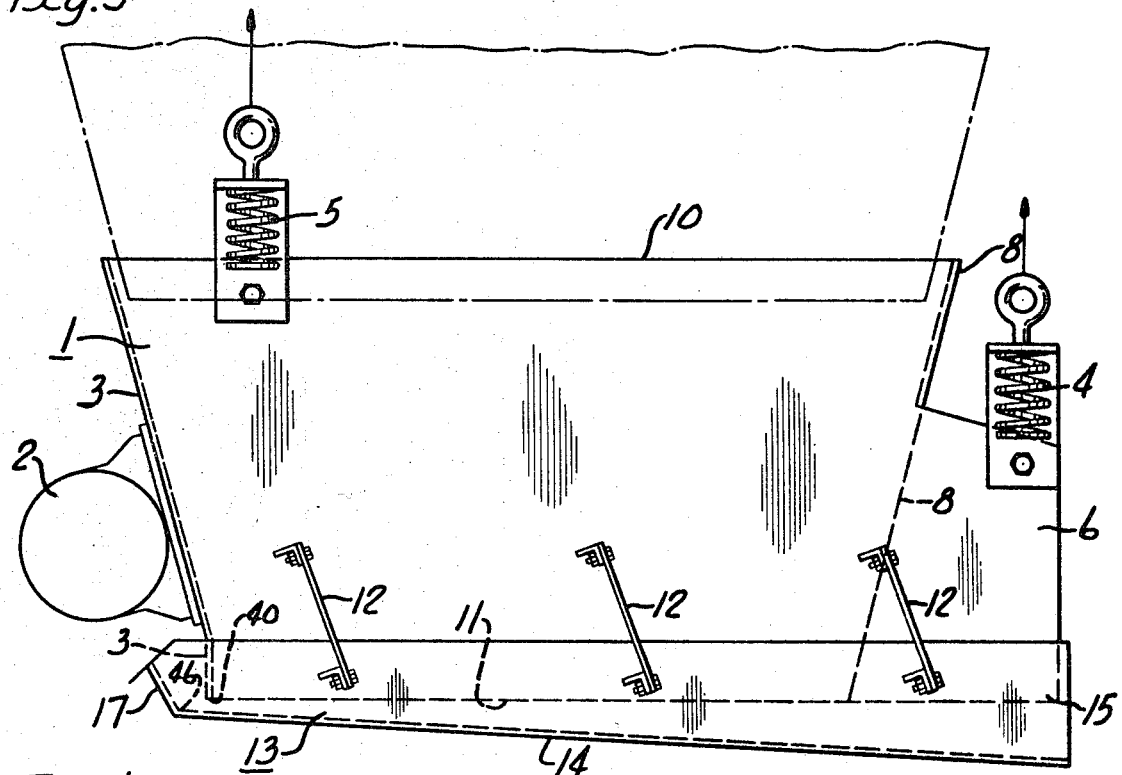
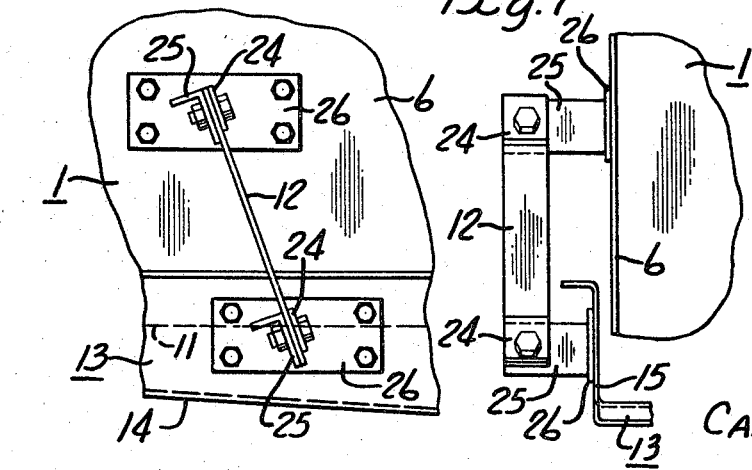
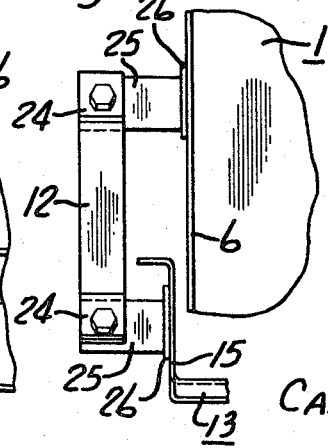

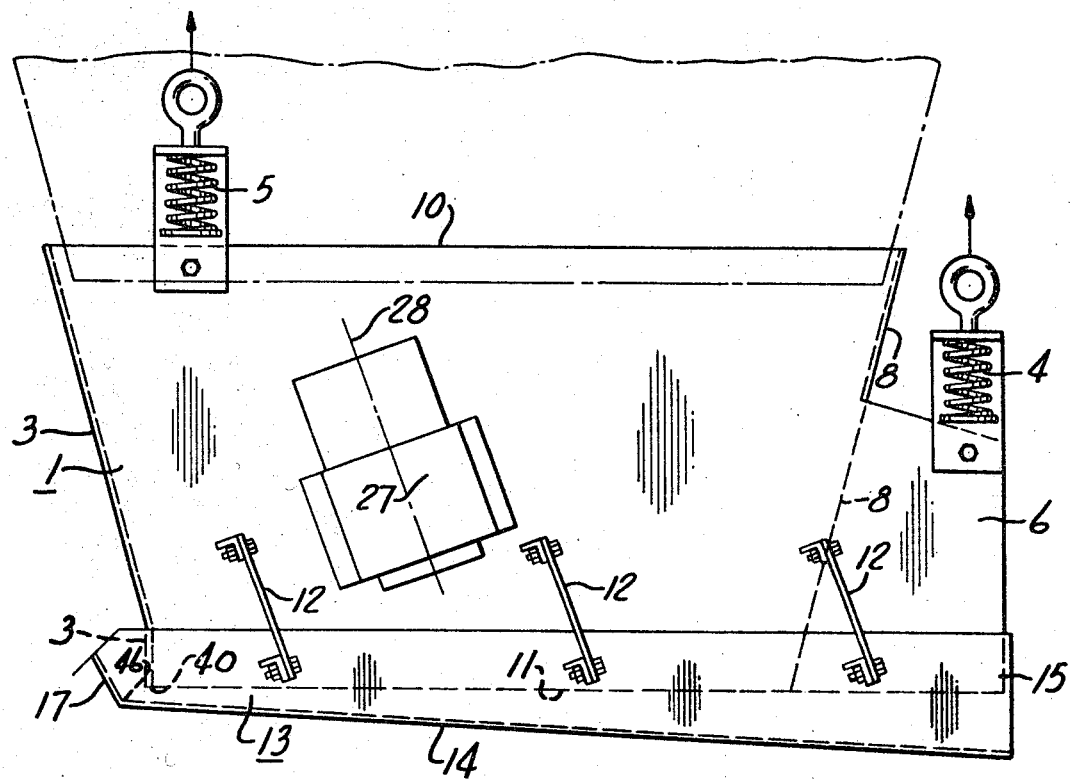
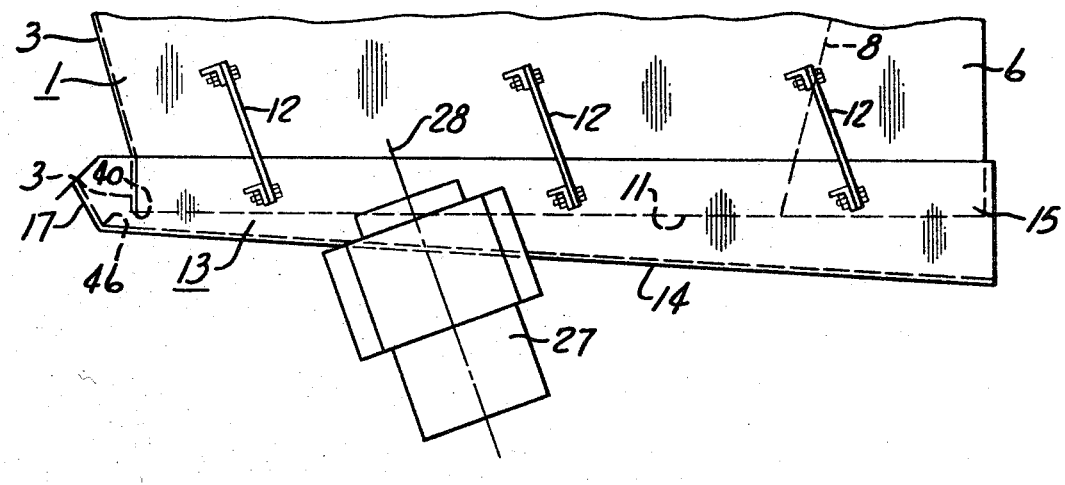

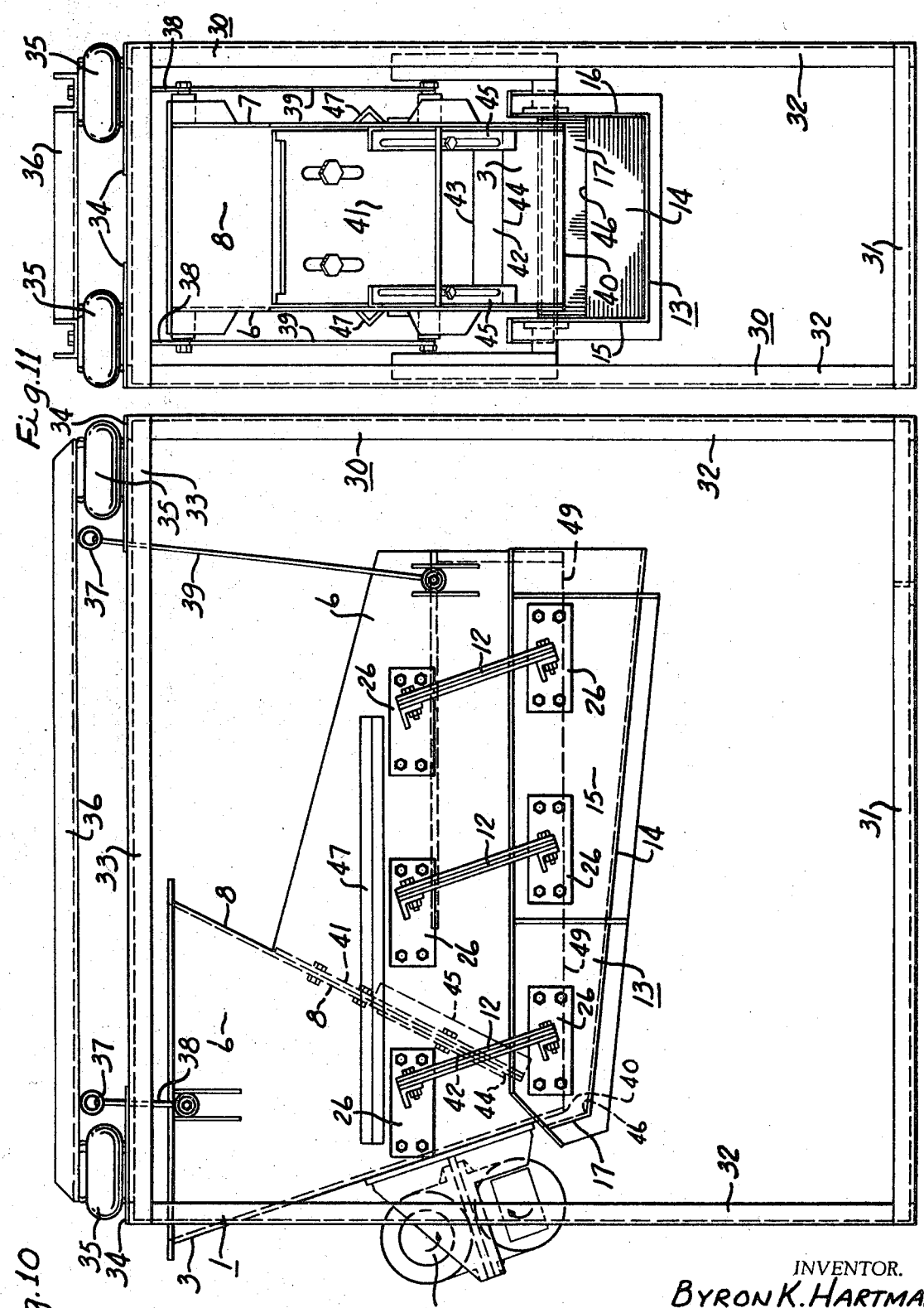

PATENTED JAN 5 1971

INVENTOR.
BYRON K. HARTMAN
BY
CAROTHERS & CAROTHERS
HIS ATTORNEYS

3,552,545

VIBRATORY HOPPER AND TROUGH COUPLED AS A TWO-MASS TUNED VIBRATORY SYSTEM

SUMMARY OF THE INVENTION

The lower hopper section and feeder coupled as a two-mass tuned vibratory system is suspended from the main hopper or from an independent frame on isolators which thereby independently support the two-mass swing system, The top opening of the lower hopper section is sufficiently large to slip over the mouth of the principal hopper with ample perimetral space therebetween to permit free vibratory action. Sets of parallel springs are suspended from opposite sides of the lower hopper section or vibratory hopper the other or opposite ends of which are secured to the feeder of the two-mass system. The feeder or vibratory trough extends upwardly around the lower opening of the vibratory hopper so as to completely receive all the material flowing therefrom the trough then serving to carry all the material forwardly to the discharge point thereof. The vibratory action on the hopper section promotes the flow of the material through the lower discharge opening thereof and on to the trough.

The exciter for the vibratory system is preferably a single or double rotary vibratory motor the speed of which is readily controlled. If one rotary vibratory motor is employed as the exciter it is positioned to the rear of either the vibratory hopper or vibratory trough. If there are two vibratory motors, they may be positioned on opposite sides of the vibratory hopper or vibratory trough or adjacent to each other at the rear of the vibratory hopper or trough with the shafts of the two vibratory rotary motors being parallel with each other in each instance. Under this condition, the motors must be rigidly connected to the hopper section or to the trough and the eccentric weights rotated by each motor should be operated with opposite rotation whereby they will seek their own synchronism and provide an exciting force at right angles to the axes of the rotary shafts and between the same. Thus, the axes of the rotary vibratory motors must be transverse of the springs if the motors are disposed in horizontal planes, or, when the motors are disposed substantially vertically, the axes should be substantially parallel with the springs. The rotary vibratory eccentric weight exciters should operate at a maximum frequency approximately 10 percent less than the natural vibratory frequency of the two-mass tuned system. This is true regardless of whether or not the rotary vibratory exciters are employed as a single unit or in pairs and regardless of whether or not they are mounted on the vibratory hopper or the vibratory trough of the two-mass system.

BRIEF DESCRIPTION OF THE DRAWINGS

The accompanying drawings show for the purpose of exemplification, without limiting the invention thereto, certain practical embodiments of the present invention wherein:

FIG. 1 is a view in side elevation illustrating a two-mass vibratory system comprising a lower hopper section coupled with a trough and employing a single eccentric weight rotary motor mounted on the back of the hopper section.

FIG. 2 is a diagrammatic showing in plan of the top and bottom openings of the lower hopper section shown in FIG. 1.

FIG. 3 is a view in side elevation of a modified two-mass system including a lower hopper section having a long and narrow bottom opening.

FIG. 4 is a diagrammatic showing in plan of the top and bottom openings of the hopper section shown in FIG. 3.

FIG. 5 is a view in side elevation of a portion of the systems of FIGS. 1 or 3 illustrating a modified exciter comprising a dual rotary vibratory drive mounted on the hopper section.

FIG. 6 is an enlarged view in side elevation of a portion of the systems of FIGS. 1 or 3 particularly illustrating the spring suspension between the hopper and the trough of the two-mass system.

FIG. 7 is a view in end elevation of the spring suspension shown in FIG. 6.

FIG. 8 is a view in side elevation of a two-mass system similar to the structure of FIG. 3 but employing a single rotary eccentric weight motor mounted on each side of the lower hopper section.

FIG. 9 is a view in side elevation of a portion of the system of FIG. 8 employing a modified exciter means including an eccentric weight rotary motor drive on the trough of the two-mass system.

FIG. 10 is a view in side elevation of another modification of the two-mass system of the present invention and includes a dual eccentric weight rotary motor drive mounted on the rear of the hopper section which hopper section is suspended from an isolator stand.

FIG. 11 is an end elevation of the structure shown in FIG. 10.

DESCRIPTION OF THE PREFERRED EMBODIMENTS

Figure 12:
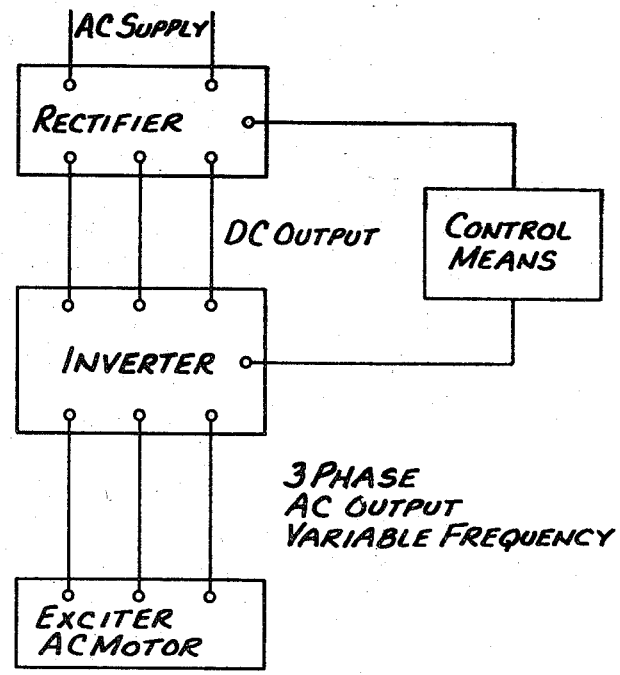
FIG. 12 is a block of a control circuit for the vibratory exciter means.

Referring to FIGS. 1 and 2, a hopper is provided with an upper section and a lower section 1 which includes in its mass the single eccentric weight rotary motor drive 2 mounted on the rear wall 3 and which is independently supported by and isolated from the upper section by the forward and aft spring suspension members 4 and 5 secured to the side plate 6. The opposite side plate is indicated in FIG. 2 at 7. The rearwardly sloping front plate 8 as well as the forwardly sloping rear plate 3 forming the front and rear walls define the front and rear edges of the top opening 10 of the lower hopper section whereas the side plates 6 and 7 define the sides of the top opening 10 as shown in FIG. 2. The bottom of the front and rear plates 8 and 10 respectively, as well as the bottom edges of the plates 6 and 7 form the bottom opening 11.

The vertical side plates 6 and 7 extend forwardly to receive the spring suspension members 4 and 5 on each end thereof as well as the tuned connecting springs 12 connecting the two masses of the two-mass system represented by the lower hopper section 1 and the trough 13. The bottom 14 of the trough extends sufficiently below the bottom opening 11 to provide an adequate space for the flow of the material down the trough. The sides 15 and 16 of the trough extend above the lower edges of the hopper side plates 6 and 7 so as to completely encompass the bottom opening 11. The rear wall of the hopper extends to a point slightly above the bottom 14 of the trough.

This two-mass swing system will have a natural frequency of vibration; however, the eccentric weight rotary motor drive 2, at its maximum, provides a driving or operating frequency of 10 percent lower than the natural frequency of the two-mass swing system. This tuning arrangement as determined by the characteristics of the springs 12 and the relative masses of the hopper and its contents and the trough and its contents wherein the natural frequency is slightly higher than the applied frequency provides a satisfactory operation of the two-mass system.

Referring to FIGS. 3 and 4, a structure is there shown wherein the lower hopper section 1 is merely a different shape than that shown in FIG. 1. The width W of the hopper section is shorter than the length L whereas, in the hopper section shown in FIG. 2, the reverse was the case. It will also be noted that the side plates 6 and 7 are sloped inwardly so as to define a trapezoidal shaped opening at the bottom of the hopper section.

Referring to FIGS. 6 and 7 which show a detailed construction of the mounting of the tuned springs 12, it will be seen that each of the ends of the springs are secured between a clamping plate 24 and an angle iron 25. It is preferable to provide a washer (not shown) that has some degree of resiliency such as Fiberglas or a yieldable metal between the surfaces of the clamping plate and the angle iron and the respective faces of the springs or between adjacent springs which may be clamped together. These resilient members will flex within their elastic limit and prevent fretting of the spring members. The angle irons 25 are welded to supporting plates 26 which are riveted or otherwise rigidly secured to the respective sidewalls 6 and 15 of the lower hopper section 1 and the trough 13. In FIG. 5, there is shown a modified drive 18 including a pair of rotary vibrators rigidly mounted to the rear wall 3 of the hopper section 1. It will be noted that the vibrators are arranged to rotate in opposite directions, as shown by the arrows 20 and 21, and that the plane 23 passing through the axes of the vibrators is generally parallel to the interconnecting leaf springs 12 whereby the vibratory forces imparted by the drive will be imposed in a direction normal to the springs.

Referring now to FIGS. 8 and 9, a further modified drive is shown including two eccentric weight rotary motors, one secured to each of the opposite sides of the device on plates 6 and 7 and their rotary axes 28 are disposed parallel with the longitudinal axes of the springs 12. The supporting structure, including the sidewalls of the hopper section and the trough, should be made sufficiently rigid to synchronize these rotary motors. Even though the motors may be mounted on opposite sides of the hopper section as in FIG. 8, or on opposite sides of the trough as in FIG. 9, they will be effective in operating the two-mass swing system in the same manner as that disclosed in FIGS. 1, 3 and 5. The vibratory system of FIGS. 8 and 9 is similar to that shown in FIG. 4.

Referring now to FIGS. 10 and 11, a modified structure is there shown which includes an isolator suspension frame 30 having a rectangular base frame 31, a set of upright frame members 32 positioned at the corners of the base frame, and a top frame 33 supported by the upright frame members and carrying a plate 34 which supports a pneumatic isolator 35 at each corner. The four isolators 35 in turn support the isolated frame 36 which is also rectangular and has the hangers 37 secured thereto which support the pairs of slings 38 and 39 that are arranged to suspend the lower hopper section 1. The rear wall 3 of the hopper section 1 supports the dual eccentric weight rotary motor drive 18 as illustrated in FIG. 5. The springs 12 are mounted as illustrated in FIGS. 1, 6 and 7 and are rigidly at their opposite ends to the bolstering plates 26 on the mass structures, namely, the hopper section 1 and the trough 13.

In the embodiment of FIGS. 10 and 11, the lower edge 40 of the rear wall 3 terminates above the bottom 14 of the trough while the lower edge of the front wall 8 is made variable by means of an extension comprised of overlapping plates 41 and 42, the latter of which extends below the bottom edge 43 of the plate 41. The bottom edge of the lower plate represents the effective lower edge of the front plate 8. The plate 42 is an adjustable valve and its lower edge 44 may be moved upwardly or downwardly since the side edges of the plate are adjustably mounted upon angle irons 45 on the opposite walls 6 and 7 of the hopper section. The feeder action through the lower opening between edges 40 and 44 is augmented by the vertical areas above the effective front and rear walls 8 and 3 all of which aid in feeding the material from the upper opening to the lower opening of the hopper section.

It should also be understood that the bottom 14 of the trough is the actual supporting surface under the throat or opening of the hopper section 1 and this surface extends rearwardly to the rearward corner 46 which is behind the opening lip or edge 40 at the bottom of the hopper wall 3. The movement of the material forwardly on the downwardly sloping floor 14 carries with it the material in the bottom throat or between the plate edges 40 and 44.

Reinforcing angle members 47 are positioned on opposite sides 6 and 7 of the hopper to reinforce the same.

The fact that the sides 6 and 7 of the hopper section extend forwardly for a distance substantially equal to the length of the trough adds a material mass to the hopper section aiding in the feeder action on the material within the same. Thus, a smooth and continuously operating flow of material is provided.

The means for varying the driving or applied frequency of vibration is shown by FIG. 12. The AC supply, whether single or three phase, is rectified by a rectifier, the DC output of which is applied to an inverter for conversion back to AC at a controlled variable frequency. A control means in the feedback path between the inverter and the rectifier provides the means for varying the frequency to the desired value with the maximum being set at just below the natural frequency of the vibratory system and, preferably, at 90 percent of the natural frequency. The output of the inverter may be applied directly to the various rotary drive motors disclosed herein.

Figure 13:
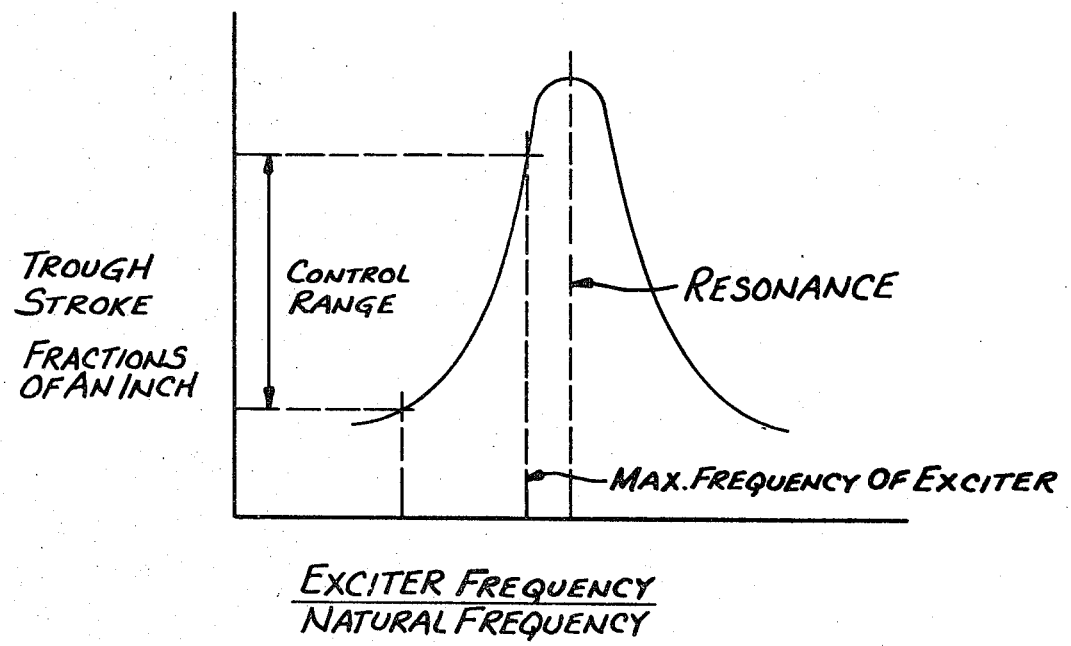
FIG. 13 shown an amplification curve illustrating the stroke control range of the two-mass tuned vibrating hopper and trough system.

FIG. 13 is the amplification curve of the spring coupled hopper and trough system which is tuned to have a natural frequency approximately 10 percent higher than the frequency of the exciter drive or motor combinations 2, 18 and 27. The stroke is adjustable to a minimum by means of frequency control as illustrated on this curve. Thus by actuating a control as shown in FIG. 12 the stroke may be varied by changing the exciter frequency between the maximum and a minimum where the output is reduced to zero.

I claim:

1. Vibratory feeding apparatus for use with a hopper for the storage of bulk material, said hopper including an upper section having a lower discharge opening therein, said feeding apparatus comprising a first vibrating mass including the lower section of said hopper, said lower hopper section having an upper opening therein aligned with the discharge opening of said upper hopper section, said lower section having a lower discharge opening and at a least a pair of oppositely positioned downwardly converging wall portions for directing the material received within said lower section to its lower discharge opening; means mounting said lower hopper section in superposed but spaced relationship to said upper hopper section so that vibratory forces imparted to the lower section will not be transmitted to the upper section; a feeder trough comprising a second vibrating mass; spring means rigidly connected to said feeder trough and to said lower hopper section for mounting said feeder trough beneath said lower hopper section to receive material therefrom and discharge it at a discharge point laterally thereof; and vibratory means mounted upon one of said vibrating masses for imparting oscillatory movement thereto to cause material to be deposited from said lower hopper section to said trough and along said trough to a material discharge point; the natural frequency of the vibrating system which includes said lower hopper section, said feeder trough and said spring means being close to the maximum operating frequency of said vibratory means.

2. Vibratory feeding apparatus according to claim 1 including means for varying the frequency of said vibratory means.

3. Vibratory feeding apparatus according to claim 1 wherein said vibratory means comprises a rotating, eccentrically mounted mass.

4. Vibratory feeding apparatus according to claim 3 wherein the rotary axis of said vibratory means is positioned transversely of the feeding direction of said trough and generally rearwardly thereof.

5. Vibratory feeding apparatus according to claim 1 wherein said spring means comprises a plurality of flat spring members arranged along each side of said feeder trough and each of which is positioned at an acute angle to the vertical with the upper end thereof extending rearwardly of the direction of movement of material upon said feeder trough.

6. Vibratory feeding apparatus according to claim 5 wherein said vibratory means comprises a pair of rotary vibrators each of which includes a rotating, eccentrically mounted mass; said rotary vibrators being mounted upon opposite sides of said apparatus with respect to the feeding path of said feeder trough; and the axes of said rotary vibrators extending parallel to the axes of said flat spring members.

7. Vibratory feeding apparatus according to claim 5 wherein said vibratory means comprises a pair of rotary vibrators each of which includes a rotating, eccentrically mounted mass; said rotary vibrators being mounted adjacent to each other with the axes thereof extending parallel to each other within a plane which is generally parallel to the planes of said flat spring members; said rotary vibrators being adapted to be rotated in opposite directions.

8. Vibratory feeding apparatus according to claim 1 wherein said vibratory means is mounted upon the rearward portion of said apparatus with respect to the direction of movement of material upon said feeder trough.

PO-1050
(5/69)

UNITED STATES PATENT OFFICE
CERTIFICATE OF CORRECTION

Patent No. 3,552,545                Dated August 10, 1971

Inventor(s) BYRON KING HARTMAN

It is certified that error appears in the above-identified patent and that said Letters Patent are hereby corrected as shown below:

Column 2, line 17, after "block" insert --diagram--. Column line 19, change "shown" to --shows--. Column 3, line 40, after "section" delete "1". Column 3, line 44, after "are" insert --secured--. Column 3, line 51, after "edge" insert --44--.

Signed and sealed this 28th day of December 1971.

(SEAL)
Attest:

EDWARD M. FLETCHER, JR.          ROBERT GOTTSCHALK
Attesting Officer                Acting Commissioner of Patents